(12) United States Patent
Nickolayev et al.

(10) Patent No.: US 7,318,199 B2
(45) Date of Patent: Jan. 8, 2008

(54) ALGORITHM FOR AUTOMATIC LAYOUT OF OBJECTS IN A DATABASE

(75) Inventors: Oleg Nickolayev, Redwood Shores, CA (US); David Thompson, San Francisco, CA (US); Yogeshwar Wamanrao Kuntawar, Sunnyvale, CA (US); Laura Anne Brogoch, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 790 days.

(21) Appl. No.: 10/660,931

(22) Filed: Sep. 11, 2003

(65) Prior Publication Data

US 2005/0057575 A1   Mar. 17, 2005

(51) Int. Cl.
*G06F 3/00* (2006.01)
*G06F 9/00* (2006.01)
*G06F 17/00* (2006.01)
*G09G 5/00* (2006.01)

(52) U.S. Cl. ...................... 715/735; 345/619; 715/734; 715/736; 715/737; 715/738

(58) Field of Classification Search ................ 345/619; 715/734–738, 853–855; 709/200–253
See application file for complete search history.

(56) References Cited

U.S. PATENT DOCUMENTS 4,953,106 A * 8/1990 Gansner et al. ............. 345/440
5,276,789 A * 1/1994 Besaw et al. ............... 345/440
6,067,093 A * 5/2000 Grau et al. .................. 345/440
6,854,091 B1 * 2/2005 Beaudoin .................... 715/854

FOREIGN PATENT DOCUMENTS

WO    WO 00/34896    * 6/2000

OTHER PUBLICATIONS

Martin Fowler and Kendall Scott□□UML distilled: a brief guide to the standard object modeling language□□Reading, Mass.: Addison Wesley c2000□□2nd edition.*
Ron Davidson and David Harel□□Drawing graphs nicely using simulated annealing□□ACM Transactions on Graphics□□ACM Press Published 1996□□pp. 301-331.*

* cited by examiner

*Primary Examiner*—William Bashore
*Assistant Examiner*—Andrea N. Long
(74) *Attorney, Agent, or Firm*—Townsend & Townsend & Crew LLP (57) ABSTRACT

Systems and methods that automatically arrange, or re-arrange, object nodes in a diagram such that the total length of all associations between nodes and the number of overlapping associations is reduced or minimized. In mathematical terms, the process simplifies the graphical representation of an arbitrary graph. In one aspect, processes of the invention use a physical model of particle interactions to determine a minimal energy state, with object nodes modeled as particles and the associations between the object nodes modeled as interaction forces. Perturbations applied to the system allow for a determination of a minimal energy state.

20 Claims, 5 Drawing Sheets

Layout Algorithm

FIG. 1

Layout Algorithm

ALGORITHM FOR AUTOMATIC LAYOUT OF OBJECTS IN A DATABASE

BACKGROUND OF THE INVENTION

The present invention relates to systems and methods for simplifying nodes in a network display, and more particularly to systems and methods for simplifying an object model display by automatically arranging or re-arranging objects in the model.

One goal of modeling systems, such as the Unified Modeling Language (UML) and other modeling systems, is to provide a means to specify, construct, document and visualize the artifacts of a distributed system such as a distributed object system in the case of UML. The display rendered in such systems provides the user with a visual feedback that allows the user to simply and easily understand the model paradigm being created or implemented. In the case of UML, or other object modeling systems, object nodes are displayed in a topology along with relationships (e.g., associations) between the various object nodes so as to create an object network topology. Object nodes are typically connected by connector lines which represent various associations between objects nodes. In the case of workflow, for example, the connector lines represent the direction of control flow between objects, and in the case of UML tools, the connector lines represent association or inheritance relationships between the objects.

However, such network topology displays become very confusing for large topologies (e.g., large number of objects and associations): the user is often presented with a complex web of tangled connections. Above a certain level of network complexity, it becomes difficult for the user to make much sense of the display and to determine which nodes are connected. For example, if two object nodes in opposite corners of a displayed diagram are connected by an association, the corresponding connector line may cross the entire diagram and possibly other object nodes. Consequently, it may be very difficult to determine to which object nodes the connector line is associated. Current development tools, such as Rational Rose and Oracle's JDeveloper, only provide limited means for re-organizing object nodes and do not provide a robust automatic solution to such problem.

Accordingly, it is desirable to provide systems and methods for automatically simplifying a network display, and in particular an object node display, to allow a user to easily identify and determine which nodes are connected.

BRIEF SUMMARY OF THE INVENTION

The present invention provides systems and methods for arranging, and re-arranging, interconnected network nodes in a display in a manner that simplifies the network view, and therefore also improves the visual understanding of the network imparted to a viewer of the display.

According to the present invention, a process is provided that automatically arranges, or re-arranges, object nodes in a diagram such that the total length of all connector lines between nodes and the number of overlapping connector lines is reduced or minimized. In mathematical terms, the process simplifies the graphical representation of an arbitrary graph. In one aspect, the process uses a physical model of particle interactions to determine a minimal energy state, with object nodes modeled as particles and the associations between the object nodes modeled as interaction forces. Perturbations applied to the system allow for a determination of a minimal energy state.

The process of the present invention provides for automatically arranging object nodes when rendering a new diagram, for example when combining objects from two or more UML diagrams, or automatically re-arranging object nodes for an existing diagram, for example after a UML object diagram has been created.

According to an aspect of the present invention, a computer-implemented method of automatically re-arranging nodes in a display is provided. The method typically includes displaying a plurality of nodes in a first configuration on a display, wherein each node has associations with one or more nodes, each association being represented by a physical connector between the associated nodes on the display, and automatically re-arranging the displayed nodes to a second configuration such that a total length of all connectors is minimized and such that a number of overlapping connectors is minimized. In one aspect, the nodes represent objects in a UML diagram and the connectors represent associations between objects.

According to another aspect of the present invention, a computer-implemented method of automatically arranging a plurality of nodes in a display is provided. Each node has associations with one or more nodes, each association being represented by a physical connector between the associated nodes on the display. The method typically includes determining an original configuration of a plurality of nodes to be displayed, each node having a pair of display coordinates, and determining the associations for each node, each association to be represented on the display as a physical connector between the associated nodes. The method also typically includes determining a node configuration wherein a total length of all connectors is minimized and wherein a number of overlapping connectors is minimized, and displaying the plurality of nodes in the node configuration on the display. In one aspect, the nodes represent objects in a UML diagram and the connectors represent associations between objects.

According to yet another aspect of the present invention, a computer system configured to automatically re-arrange nodes in a display is provided. The system typically includes a display for displaying node configurations, wherein a plurality of nodes is displayed in a first configuration on the display, wherein each node has associations with one or more nodes, and wherein each association is represented by a physical connector between the associated nodes on the display. The system also typically includes a means for automatically re-arranging the displayed nodes to a second configuration on the display such that a total length of all connectors is minimized and such that a number of overlapping connectors is minimized.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE INVENTION

Figure 1:
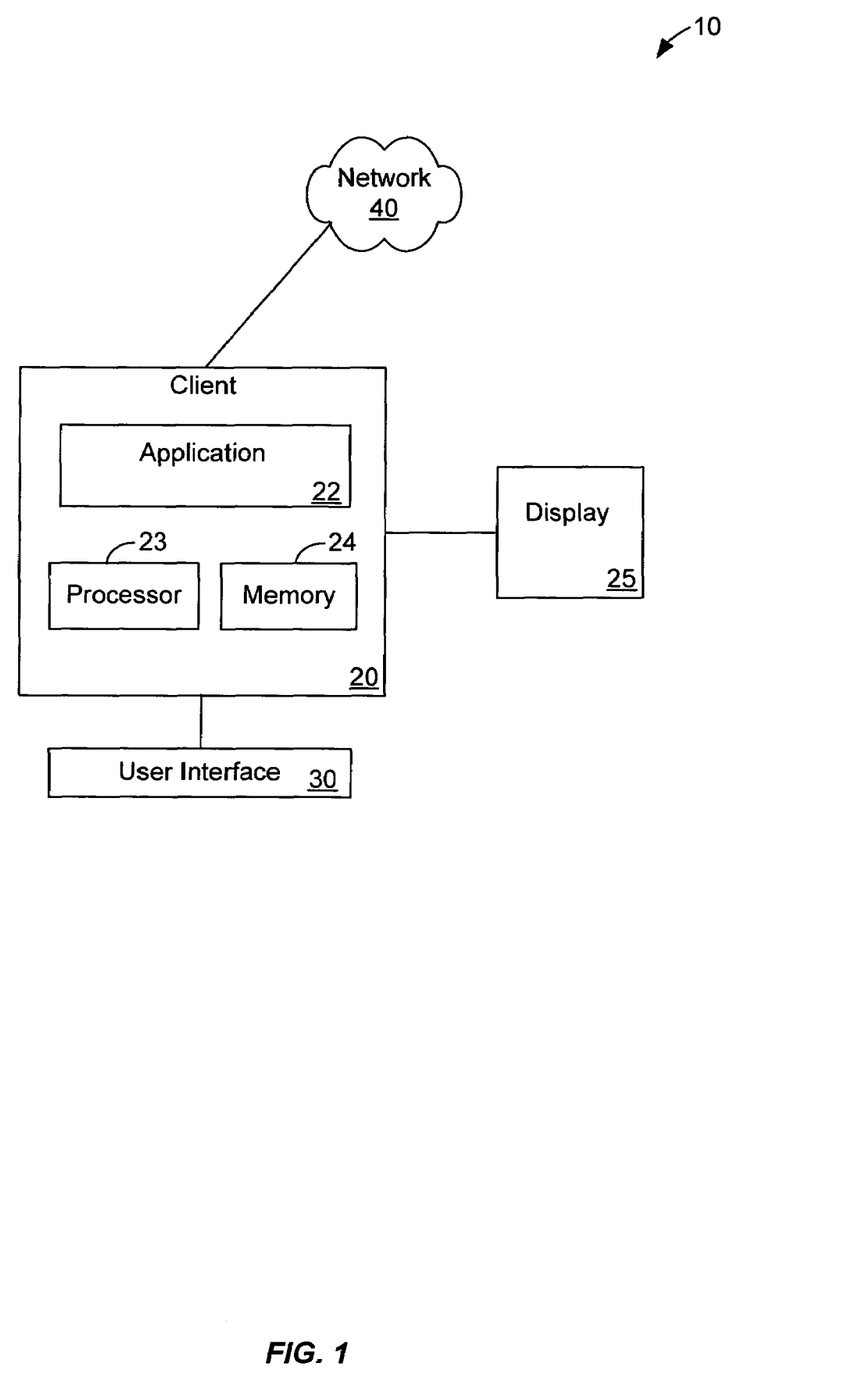
FIG. 1 illustrates an exemplary display system 10 according to the present invention.

FIG. 1 illustrates an exemplary display system 10 according to the present invention. Display system 10 includes a client device 20, coupled to, or including a display device 25 and a user interface device 30. Client device 20 could be a desktop personal computer, workstation, laptop computer, or any other computing device. Client device 20 preferably includes components capable of interfacing directly or indirectly with a network 40. Network 40 can be the Internet, a local area network (LAN), wide area network (WAN), virtual private network (VPN) or any other type of network. Each client 20 typically runs an application program 22 allowing a user of client 20 to create and visualize a topology of network nodes as will be discussed in more detail below. Each client device 20 also typically includes one or more user interface devices 30, such as a keyboard, a mouse, touchscreen, pen or the like, for interacting with a graphical user interface (GUI) provided by the application program 22 on a display device 25. In general, display device 25 is any device capable of rendering a display of a network topology including, for example, a monitor screen, LCD display, printer, etc.

The application program 22 typically includes computer code run using a central processing unit 23 such as an Intel Pentium processor or the like. Computer code for operating and configuring client 20 (e.g., application program 22) as described herein is preferably stored to memory 24 such as a hard disk, but the entire program code, or portions thereof, may also be stored in any other memory device such as a ROM or RAM, or provided on any media capable of storing program code, such as a compact disk (CD) medium, digital versatile disk (DVD) medium, a floppy disk, or the like. Additionally, the entire program code, or portions thereof may be downloaded from a software source to client 20 over network 40, for example, over the Internet as is well known, or transmitted over any other conventional network connection as is well known, e.g., extranet, VPN, LAN, etc., using any communication medium and protocols (e.g., TCP/IP, HTTP, HTTPS, Ethernet, etc.) as are well known. Additionally, portions of the program code may be downloaded or provided to client device 20 and executed on client device 20. In one aspect, portions of the program code are executed simultaneously at different locations (e.g., client-server process wherein one or more clients 20 are connected to one or more servers) and the communication between the different parts is transmitted over the Internet or other network connection/medium.

In one embodiment, application program 22 is configured to interface with an object modeling system process, such as UML, executing on client 70 to provide simplified views of an object model being created or implemented. The invention will now be described with reference to an object model wherein objects are displayed as object nodes and wherein associations between objects are displayed as connector lines, or connectors. It is understood, however, that the present invention is useful for simplifying displays of other network topologies, such as a computer network topology, a circuit diagram, etc. or any other topology requiring nodes and interconnections or associations.

In one embodiment, each object node is identified by an x-coordinate and a y-coordinate representing where on the display (e.g., x-y graph) a point of the object node will be displayed. In one aspect, the x-y coordinates represent the center point of each node, however, each x-y coordinate could represent any arbitrary point in the displayed node, such as one of the corners or along one of the edges of a node represented as a square or rectangle. The coordinates are preferably stored as arrays of x-y coordinates. Thus, in one aspect, objects nodes are identified by an array of x-y coordinates: x[i], y[i], where i ranges from 1 to N, the number of object nodes to be displayed.

Figure 2:
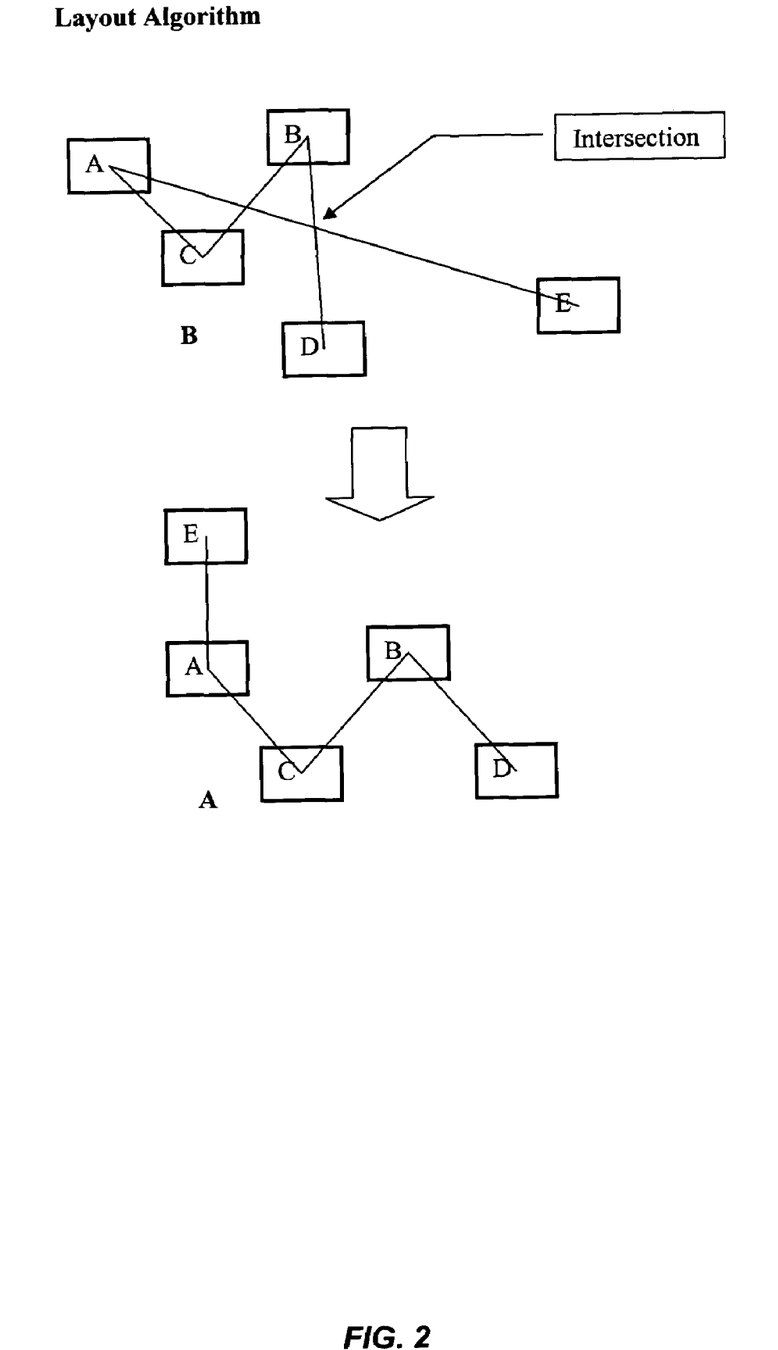
FIG. 2 illustrates an example of a network diagram before and after simplification according to one embodiment.

FIG. 2 illustrates an example of a generic network diagram before and after simplification by application program 22 according to one embodiment. In this example, each node is displayed as a rectangular object (not necessarily an "object" in the programming sense), and associations between nodes are displayed as connector lines, or connectors. In FIG. 2, five nodes are displayed with connector lines. In the above representation, before simplification, two intersections representing overlapping connectors are evident, specifically, the connector between nodes A and E (A-E) intersects the connectors C-B and D-B. In the lower representation, after processing by the simplification process (e.g., embodied in application program 22), the sum length of all associations is minimized as are the number of intersections.

The association lengths, or lengths of connectors, are preferably determined based on a simple Cartesian distance metric, r. For example, the distance between an object node i and an object node j is represented by, $r=sqrt(rx^2+ry^2)$, where $rx=x[j]-x[i]$ and $ry=y[j]-y[i]$. In one aspect, association lengths are preferably minimized with respect to a target value. That is, the target value defines an optimal association length for each association, as well as an optimal minimum distance between nodes not having an association or connector. In the particle interaction model analogy, particle nodes having an association length greater than the target value are attracted to each other by a virtual attractive force, and particles having an association length less than the target value are repelled by a virtual repulsion force such that the minimum energy state between two associated nodes is when the association length is at the target value.

After iterative processing as will be described below, the particle nodes settle to a minimum energy state. However, it may be that some or many associations will be confined to lengths greater than or less than the target value due to other conflicting node interactions in complex diagrams. In one aspect, if object nodes do not have an association they can only repel each other if the length between the two nodes is less than the target value. For example, during the iterative process, to better spread out nodes, if two nodes have a separation value (calculated similar to an association length) that is less than the target value, these two nodes will experience a virtual repulsive force relative to each other so that they spread out and are not displayed too close to each other. In one aspect, the target value is user configurable, however a default value of, for example, 50 or 100 pixels, or some other pixel distance that would provide a non-cluttered display is provided for the target value. In another aspect, the target value is a function of the number, N, of nodes to be displayed.

Figure 3:
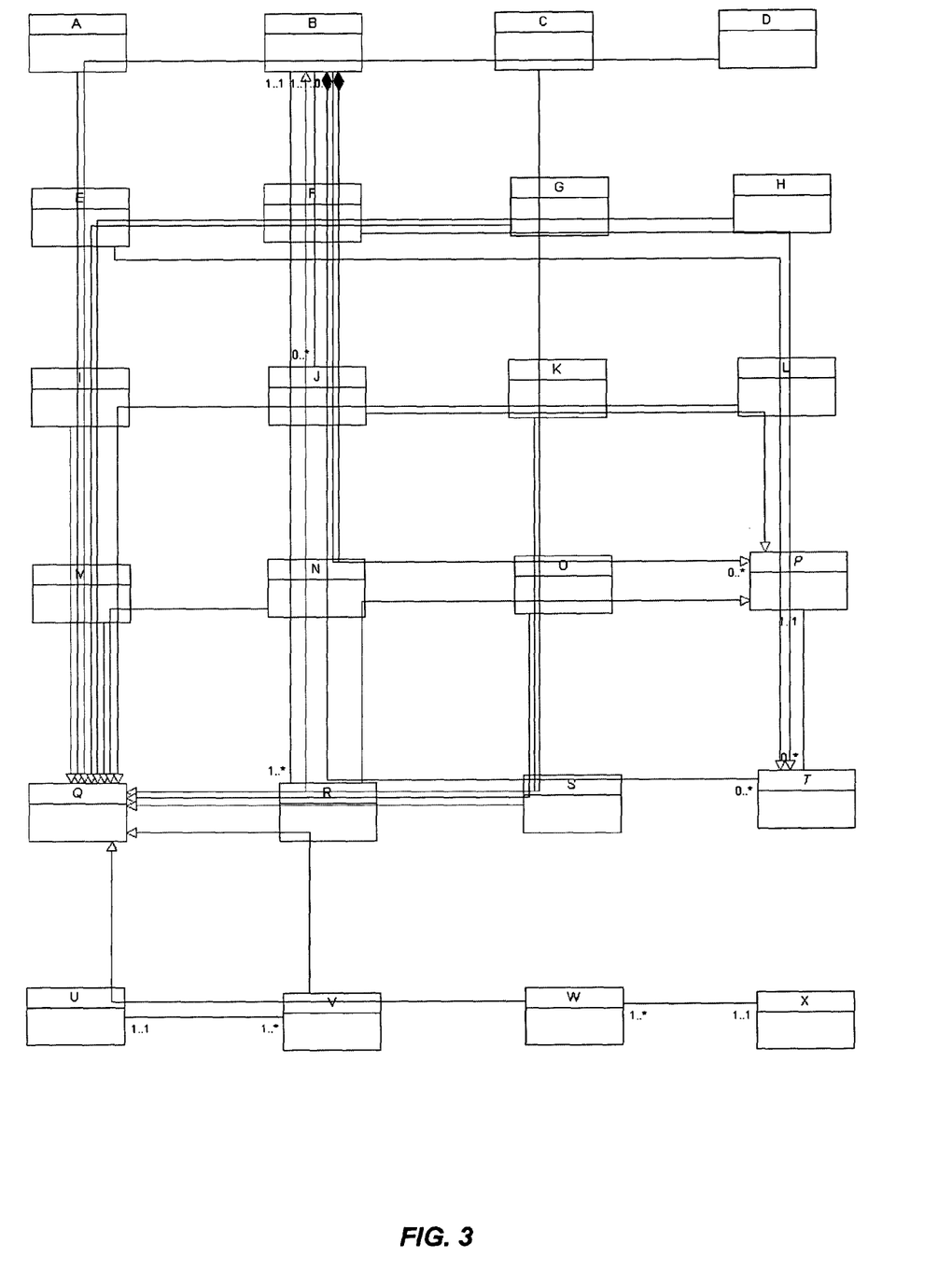
FIG. 3 illustrates an example of a UML object-node diagram, where the various objects, designated by letters "A" through "X", are arranged in a simple four column grid

FIG. 3 illustrates an example of a UML object-node diagram, where the various objects, designated by letters "A" through "X", are arranged in a simple four column grid.

As can be seen, with the various associations between object nodes overlapping and even crossing over object nodes, it is difficult to determine associations and to readily glean useful information from the diagram. Although a user may be provided with tools to manually adjust the display, this can be time consuming. Advantageously, the present invention provides processes for automatically simplifying such a complex diagram.

According to one embodiment of the present invention, application 22 includes code configured to iteratively process the nodes to be displayed. In particular, the code iteratively processes each node to determine a configuration having a minimum virtual energy state. The application begins by calling a main process ("Main Algorithm"). The main process, in one aspect, begins by re-assigning the coordinates of a node to one of a plurality of pre-defined positions. For example, and as implemented in the sample code below, the application sequentially processes each node by re-assigning the coordinates of the node to each of the four corners of the display. Upon each re-assignment for the node, the process performs a relaxation process (e.g., relax( ), "Relaxation Algorithm" shown below) that minimizes association lengths relative to a target value for the given configuration. The relaxation process will be described below. The main process then determines the number of intersections (intersecting connectors) in this new (relaxed) configuration, and if the number of intersections is less than before, the re-assigned coordinates are saved as the x-y coordinates for that node. The main process continues in this manner, processing the node in each of the remaining corners (or predefined positions), and then repeats for the next node until all nodes are processed. The original coordinates of each node are restored during processing of subsequent nodes. Once all nodes have been processed in each of the pre-define positions, nodes are moved to a new configuration based on the previously saved new coordinates (if any) for each node and the relaxation process is executed for this configuration.

In one aspect, it is preferred that the number of pre-defined coordinate positions is comparable to the number of nodes, N, to be displayed, however, at least four pre-defined coordinate positions should be used, and any number may be used. In one aspect, as discussed above, the predefined positions have coordinates proximal each of the four corners of the display. However, it is understood that any other predefined coordinates may be used, for example proximal the middle of each side of a square display, or spaced at equidistant angular values around a circle centered on the center of the display. An example of a main process follows.

---
Main Algorithm
---

```
// input -> x[ ], y[ ] (coordinates of objects)
change = true;
max_intersections = calculateNumberIntersections( );
WHILE change DO
    change = false;
    // for all objects, move each object to each of the corners
    // and see if this reduces number of intersecting associations
    LOOP i=1:N //for all objects
        LOOP j=1:4 //for all corners
            // (1) move i-th class to j-th corner
            x[i] y[i] <- coordinates of corner
            // (2) relax new configuration:
            relax( );
            // (3) calculate number of intersections
            num_intersections = calculateNumberIntersections( );
```

---
Main Algorithm -continued
---

```
            // check if we have less intersections, than before
            IF num_intersections < max_intersections THEN
                max_intersections = num_intersections;
                save i, j
                change = true;
            END IF
            // restore initial x[i], y[i]
        END LOOP
    END LOOP
    IF change THEN
        use saved i, j
        move i-th class to j-th corner
        relax( );
    END IF
END WHILE
```

The relaxation process, when called, begins by sequentially processing each node in a main processing loop ("main relaxation loop") and then calculates a displacement value based on the virtual forces acting from all other objects ("inner relaxation loop"). For each object node (first node) being processed in the main relaxation loop, the inner loop process calculates a cartesian distance metric, r, between the first node and another object node (second node), and then calculates a displacement based on the virtual force experienced from second object node. If the first and second nodes have an association and the distance, r, between the first and second nodes is greater than the target value, the first node experiences an "attractive" virtual force and a displacement toward the second node is calculated. If no associations between the first and second node exists, no virtual attractive force is experienced. If, the distance, r, between the first and second nodes is less than a target value (regardless of whether the first and second nodes have an association), the first node experiences a "repulsive" virtual force from the second node. In either the attractive or repulsive virtual force case, a displacement in each of the x and y coordinates is calculated. In one aspect the displacement is based on a force equation of the form (1/target length−target length/$r^2$), although other useful equations may be substituted. In the case of attraction, the number of associations between the first and second nodes acts as a multiplier, such that if, for example, the first and second nodes have 3 associations, the attractive force experienced is three times as strong, and the displacement value calculated is three times greater. For this first node, the inner loop relaxation process is repeated for all other second nodes in the inner relaxation loop. The process then loops through all remaining nodes in the main relaxation loop such that each node is processed as a first node once and a second node N−1 times. Preferably all nodes are processed by each of the main relaxation loop and the inner relaxation loop in a sequential order, however any other order may be used. An example of a relaxation process follows.

| Relaxation Algorithm |
|---|

```
// run iterations to "minimize" association length
LENGTH = 50 (pixels) // desired target average length of associations
num_assoc[i][j] -> number of associations between i-th and j-th object
WHILE sum_displacement > MAX_ERROR
    sum_displacement = 0;
    LOOP i=1:N // loop through all objects ("main relaxation loop")
        // calculate displacement for i-th object
        // as a result of "forces" acting from all other objects
        dx = 0; dy = 0;
        LOOP j=1:N // loop through all objects ("inner relaxation loop")
            // object does not apply "force" to itself
            IF i=j THEN
                CONTINUE
            END IF
            // calculate x, y distance (r) between i-th and j-th objects
            rx = x[j] - x[i]
            ry = y[j] - y[i]
            // calculate square of absolute distance
            r = sqrt( rx^2 + ry^2 + 1 )
            // for distance greater than LENGTH, objects that have associations
                "attract"
            IF r > LENGTH AND num_assoc[i][j] > 0 THEN
                dx = dx + rx* num_assoc[i][j]*(1/LENGTH - LENGTH/r^2)
                dy = dy + ry* num_assoc[i][j]*(1/LENGTH - LENGTH/r^2)
            END IF
            // for distance less than LENGTH, objects "repell"
            IF r < LENGTH THEN
                dx = dx + rx*(1/LENGTH - LENGTH/r^2)
                dy = dy + ry*(1/LENGTH - LENGTH/r^2)
            END IF
        END LOOP
        // "move" objects according to calculated displacement
        K = 10; // displacement coeffient, the larger K, the faster the convergence
        x[i] = x[i] + dx * K;
        y[i] = y[i] + dy * K;
        // cummulative displacement:
        sum_displacement = sum_displacement + dx*dx + dy*dy;
    END LOOP
END WHILE
```

In the inner relaxation loop, the distance is calculated as $r=\operatorname{sqrt}(rx^2+ry^2+1)$ to avoid singularities or erroneous conditions during the iterative process for cases where objects may be exactly overlapping (e.g., x[i]=x[j] and y[i]=y[j]) or nearly overlapping. At the end of the main relaxation loop, the object nodes are moved according to the calculated displacements, and a total displacement value is determined. This new (relaxed) configuration is then used by the main process algorithm, either during the determination of a number of intersections or after reconfiguration at the end of the main loop in the main algorithm.

Figure 4:
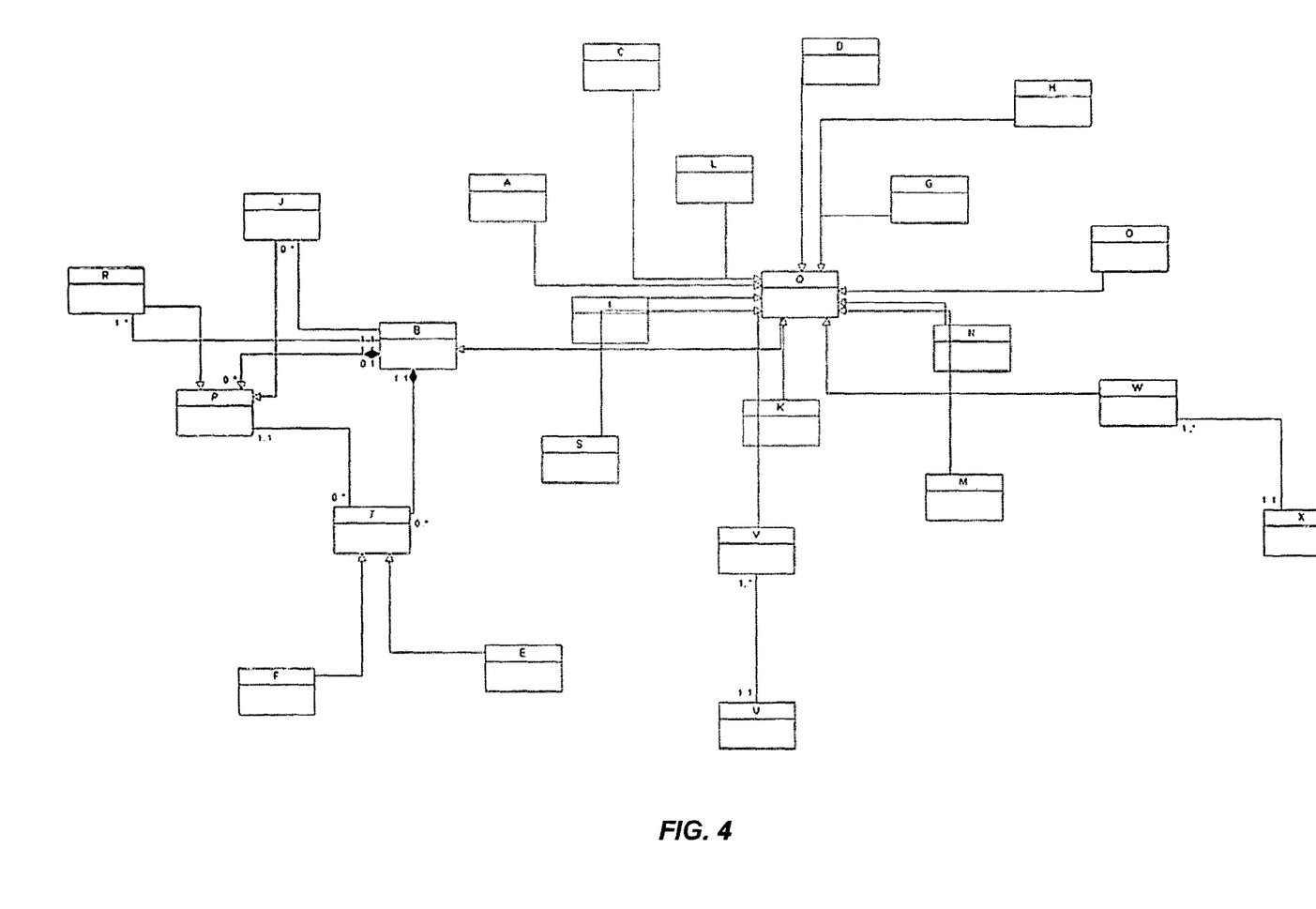
FIG. 4 illustrates the object node UML diagram of FIG. 3 after processing according to the present invention
Figure 5:
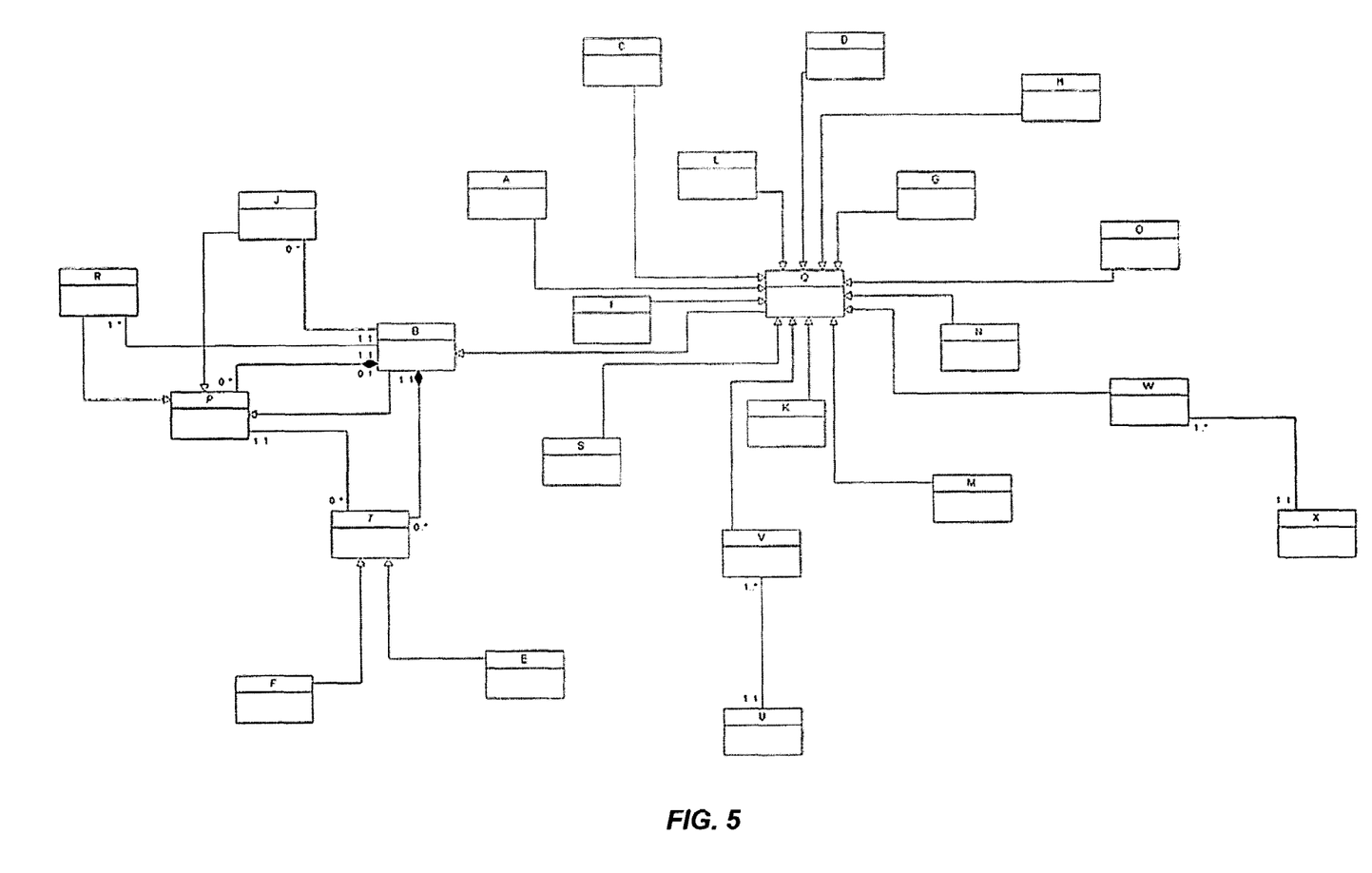
FIG. 5 illustrates the object-node UML diagram of FIG. 4 after minor manual re-positioning by the user.

FIG. 4 illustrates the object node UML diagram of FIG. 3 after simplification processing according to the present invention. As can be seen, the number of intersecting connectors has been greatly reduced relative to the configuration of FIG. 4 as has the total length of all connectors. Furthermore, it is clear that the displayed configuration is much simpler to read. However, additional simplification may be required, such as for example, removing connectors crossing objects or overlapping connectors. Such configuration, however, readily lends itself to easy manual manipulation by a user, and in fact provides for a quicker and simpler manual reconfiguration by a user, if deemed necessary, than the prior configuration (FIG. 3). FIG. 5 illustrates an example of the configuration of FIG. 4 after minor manual manipulation of connectors by a user.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of automatically re-arranging nodes in a display, the method comprising:
   displaying a plurality of nodes in a first configuration on a display, wherein each node has associations with one or more nodes, each association being represented by a physical connector between the associated nodes on the display; and
   automatically re-arranging the displayed nodes to a second configuration such that a total length of all connectors is minimized and such that a number of overlapping connectors is minimized, automatically re-arranging the displayed nodes to a second configuration including:
   iteratively, for each node:
      a) re-positioning the node to one of a plurality of pre-designated coordinates so as to form a temporary configuration;
      b) performing a relaxation process on the temporary configuration;
      c) determining a number of overlapping connectors in the temporary configuration;

d) if the number of overlapping connectors is less than a previous number of overlapping connectors, storing the pre-designated coordinates as new coordinates for the node;

e) repeating a) through d) for each of the remaining plurality of pre-designated coordinates, wherein the coordinates for all other nodes in the first configuration are used during steps a) through d); and thereafter determining the second configuration using the new coordinates stored in d), if any, for each node.

2. The method of claim 1, wherein performing a relaxation process includes, iteratively, for each first node of said plurality of nodes to be displayed:

i) iteratively, for each remaining second node of the plurality of nodes:

calculating a first distance between the first node and the second node; and if the first distance is not equal to a target length, calculating a displacement in each of the pair of display coordinates for the first node that would reduce a difference between the target length and the first distance; and thereafter ii) moving the first node according to the calculated displacement.

3. The method of claim 2, wherein calculating a displacement includes:

if the first distance is greater than a target length and if the first node and the second node have an association, calculating a displacement in each of the pair of display coordinates for the first node that would reduce the first distance; and if the first distance is less than the target length, calculating a displacement in each of the pair of display coordinates for the first node that would increase the first distance.

4. The method of claim 2, wherein the calculated displacement in each of the pair of coordinates is proportional to the equation:

$$\frac{1}{\text{target\_length}} - \frac{\text{target\_length}}{(\text{first\_distance})^2}.$$

5. The method of claim 2, wherein the calculated displacement in each of the pair of coordinates is proportional to the number of associations between the first node and the second node, if any.

6. The method of claim 2, further including calculating a cumulative displacement, and if the cumulative displacement is smaller than a target displacement value, repeating steps i) and ii) for each node.

7. The method of claim 1, wherein the nodes represent objects in a UML diagram.

8. The method of claim 7, wherein the connectors represent associations between objects.

9. A computer-implemented method of automatically arranging a plurality of nodes in a display, wherein each node has associations with one or more nodes, each association being represented by a physical connector between the associated nodes on the display, the method comprising:

determining an original configuration of a plurality of nodes to be displayed, each node having a pair of display coordinates;

determining the associations for each node, each association to be represented on the display as a physical connector between the associated nodes;

determining a node configuration wherein a total length of all connectors is minimized and wherein a number of overlapping connectors is minimized; and displaying the plurality of nodes in said node configuration on the display, wherein determining a node configuration includes:

iteratively, for each node to be displayed:

a) re-positioning the node to one of a plurality of pre-designated coordinates in the original configuration so as to form a temporary configuration;

b) performing a relaxation process on the temporary configuration;

c) determining a number of overlapping connectors in the temporary configuration;

d) if the number of overlapping connectors is less than a previous number of overlapping connectors, storing the pre-designated coordinates as new coordinates for the node;

e) repeating a) through d) for each of the remaining plurality of pre-designated coordinates, wherein the coordinates for all other nodes in the original configuration are used during steps a) through d); and thereafter determining the node configuration using the new coordinates stored in d), if any, for each node.

10. The method of claim 9, wherein performing a relaxation process includes, iteratively, for each first node of said plurality of nodes to be displayed:

i) iteratively, for each remaining second node of the plurality of nodes:

calculating a first distance between the first node and the second node; and if the first distance is not equal to a target length, calculating a displacement in each of the pair of display coordinates for the first node that would reduce a difference between the target length and the first distance; and thereafter ii) moving the first node according to the calculated displacement.

11. The method of claim 10, wherein calculating a displacement includes:

if the first distance is greater than a target length and if the first node and the second node have an association, calculating a displacement in each of the pair of display coordinates for the first node that would reduce the first distance; and if the first distance is less than the target length, calculating a displacement in each of the pair of display coordinates for the first node that would increase the first distance.

12. The method of claim 10, wherein the calculated displacement in each of the pair of coordinates is proportional to the equation:

$$\frac{1}{\text{target\_length}} - \frac{\text{target\_length}}{(\text{first\_distance})^2}.$$

13. The method of claim 10, wherein the calculated displacement in each of the pair of coordinates is proportional to the number of associations between the first node and the second node, if any.

14. The method of claim 10, further including calculating a cumulative displacement, and if the cumulative displacement is smaller than a target displacement value, repeating steps i) and ii) for each node.

15. The method of claim 9, wherein the nodes represent objects in a UML diagram.

16. The method of claim 15, wherein the connectors represent associations between objects.

17. A computer system configured to automatically re-arrange nodes in a display, the system comprising:
   a display for displaying node configurations, wherein a plurality of nodes is displayed in a first configuration on the display, wherein each node has associations with one or more nodes, each association being represented by a physical connector between the associated nodes on the display; and
   means for automatically re-arranging the displayed nodes to a second configuration on the display such that a total length of all connectors is minimized and such that a number of overlapping connectors is minimized, the automatic re-arranging of the displayed nodes to a second configuration including:
   iteratively, for each node:
      a) re-positioning the node to one of a plurality of pre-designated coordinates so as to form a temporary configuration;
      b) performing a relaxation process on the temporary configuration;
      c) determining a number of overlapping connectors in the temporary configuration;
      d) if the number of overlapping connectors is less than a previous number of overlapping connectors, storing the pre-designated coordinates as new coordinates for the node;
      e) repeating a) through d) for each of the remaining plurality of pre-designated coordinates, wherein the coordinates for all other nodes in the first configuration are used during steps a) through d); and thereafter
   determining the second configuration using the new coordinates stored in d), if any, for each node.

18. The system of claim 17, wherein the nodes represent objects in a UML diagram and wherein the connectors represent associations between objects.

19. A computer system configured to automatically arrange nodes in a display, wherein each node has associations with one or more nodes, each association being represented by a physical connector between the associated nodes on the display, the system comprising:
   means for determining an original configuration of a plurality of nodes to be displayed, each node having a pair of display coordinates;
   means for determining the associations for each node, each association to be represented on the display as a physical connector between the associated nodes;
   means for determining a node configuration wherein a total length of all connectors is minimized and wherein a number of overlapping connectors is minimized; and
   a display for displaying node configurations, wherein the plurality of nodes are displayed in said node configuration on the display,
   wherein the means for determining a node configuration includes the automatic re-arranging of the nodes to be displayed by:
   iteratively, for each node:
      a) re-positioning the node to one of a plurality of pre-designated coordinates so as to form a temporary configuration;
      b) performing a relaxation process on the temporary configuration;
      c) determining a number of overlapping connectors in the temporary configuration;
      d) if the number of overlapping connectors is less than a previous number of overlapping connectors, storing the pre-designated coordinates as new coordinates for the node;
      e) repeating a) through d) for each of the remaining plurality of pre-designated coordinates, wherein the coordinates for all other nodes in the first configuration are used during steps a) through d); and thereafter
   determining the configuration using the new coordinates stored in d), if any, for each node.

20. The system of claim 19, wherein the nodes represent objects in a UML diagram and wherein the connectors represent associations between objects.

* * * * *